US012560089B1

(12) United States Patent
Liśkiewicz et al.

(10) Patent No.: US 12,560,089 B1
(45) Date of Patent: Feb. 24, 2026

(54) TURBINE ROTOR BLADE TIP SHROUD SURFACE AND EDGE PROFILES

(71) Applicant: GE Vernova Infrastructure Technology LLC, Greenville, SC (US)

(72) Inventors: Robert Tomasz Liśkiewicz, Warsaw (PL); Nicholas Alvin Hogberg, Warsaw (PL); Mateusz Wojciech Szymański, Warsaw (PL); Alexander Martin Frick, Greenville, SC (US); Bevyn Patton Smith, Gulf Breeze, FL (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/321,623

(22) Filed: Sep. 8, 2025

(51) Int. Cl.
*F01D 5/14* (2006.01)

(52) U.S. Cl.
CPC ........ *F01D 5/141* (2013.01); *F05D 2240/301* (2013.01); *F05D 2240/305* (2013.01); *F05D 2240/306* (2013.01); *F05D 2240/307* (2013.01); *F05D 2250/74* (2013.01)

(58) Field of Classification Search
CPC ... F01D 5/12; F01D 5/14; F01D 5/141; F01D 11/006; F05D 2300/611; F05D 2240/301; F05D 2240/305; F05D 2240/306; F05D 2240/307; F05D 2250/74
See application file for complete search history.

(56) References Cited

U.S. PATENT DOCUMENTS

| | | | | |
|---|---|---|---|---|
| 8,043,061 B2 | 10/2011 | Chiurato et al. | | |
| 8,057,186 B2 * | 11/2011 | Brittingham | F01D 5/225 | 416/189 |
| 8,192,166 B2 | 6/2012 | Beeck et al. | | |
| 9,322,282 B2 * | 4/2016 | Chouhan | F01D 5/225 | |
| 9,828,858 B2 * | 11/2017 | Munoz | F01D 5/141 | |
| 10,190,421 B2 * | 1/2019 | Ristau | F01D 5/187 | |
| 11,236,620 B1 | 2/2022 | Zemitis et al. | | |
| 11,506,064 B2 | 11/2022 | Tan et al. | | |
| 11,821,336 B2 | 11/2023 | Jayana et al. | | |
| 11,946,386 B2 | 4/2024 | Zemitis et al. | | |
| 2005/0106025 A1 * | 5/2005 | Snook | F01D 5/141 | 416/189 |

* cited by examiner

*Primary Examiner* — Nathaniel E Wiehe
*Assistant Examiner* — Joshua R Bebbe
(74) *Attorney, Agent, or Firm* — James Pemrick; Charlotte Wilson; Hoffman Warnick LLC

(57) ABSTRACT

Various embodiments include a turbine rotor blade having an airfoil with a tip shroud having a radially inner, suction side surface; a radially inner, pressure side edge and/or a radially inner, suction side edge. The surface and/or edges have a nominal profile substantially in accordance Cartesian coordinate values of X, Y and Z set forth in various tables herein. The Cartesian coordinate values are non-dimensional values of from 0% to 100% convertible to distances by multiplying the values by a dovetail length expressed in units of distance. The X, Y and Z values are connected by smooth continuing arcs that are joined smoothly with one another to form the nominal profile that defines the radially inner, suction side surface; the radially inner, pressure side edge and/or the radially inner, suction side edge.

13 Claims, 6 Drawing Sheets

TURBINE ROTOR BLADE TIP SHROUD SURFACE AND EDGE PROFILES

TECHNICAL FIELD

The subject matter disclosed herein relates to turbomachines. More particularly, the subject matter disclosed herein relates to turbine rotor blade tip shroud surface and edge profiles.

BACKGROUND

Some jet aircraft and simple or combined cycle power plant systems employ turbines, or turbomachines, in their configuration and operation. Some of these turbines employ airfoils on rotating turbine rotor blades, which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. Certain airfoils include tip shrouds that are coupled to outer radial ends of the airfoils. The tip shrouds interact to form the exterior portion of a flow path relative to the rotating turbine rotor blades that include the tip shrouds. The tip shrouds are exposed to a variety of stresses that impact creep life thereof.

BRIEF DESCRIPTION

All aspects, examples and features mentioned below can be combined in any technically possible way.

An aspect of the disclosure includes a turbine rotor blade comprising: an airfoil having: a suction side, a pressure side opposing the suction side, a leading edge spanning between the pressure side and the suction side, and a trailing edge opposing the leading edge and spanning between the pressure side and the suction side; an endwall having a platform connected with the airfoil along the suction side, the pressure side, the trailing edge and the leading edge, wherein the platform of the endwall defines an origin at a pressure side, aftmost point thereof, and wherein the endwall includes a dovetail coupled to the platform and having a dovetail length; and a tip shroud connected with the airfoil along the suction side, the pressure side, the trailing edge and the leading edge, the tip shroud including a radially inner, suction side surface, wherein the radially inner, suction side surface has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radial inner, suction side surface.

Another aspect of the disclosure includes any of the preceding aspects, and the turbine rotor blade includes a third stage blade.

Another aspect of the disclosure includes any of the preceding aspects, and the tip shroud includes two tip rails.

Another aspect of the disclosure includes any of the preceding aspects, and the tip shroud further includes a radially inner, pressure side edge, and wherein the radially inner, pressure side edge has a shape having a nominal profile substantially in accordance with Cartesian coordinate values of X, Y and Z set forth in TABLE III and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, pressure side edge of the tip shroud.

Another aspect of the disclosure includes any of the preceding aspects, and the tip shroud further includes a radially inner, suction side edge, and wherein the radially inner, suction side edge has a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

Another aspect of the disclosure includes a turbine rotor blade comprising: an airfoil having: a suction side, a pressure side opposing the suction side, a leading edge spanning between the pressure side and the suction side, and a trailing edge opposing the leading edge and spanning between the pressure side and the suction side; an endwall having a platform connected with the airfoil along the suction side, the pressure side, the trailing edge and the leading edge, wherein the platform of the endwall defines an origin at a pressure side, aftmost point thereof, and wherein the endwall includes a dovetail coupled to the platform and having a dovetail length; and a tip shroud connected with the airfoil along the suction side, the pressure side, the trailing edge and the leading edge, the tip shroud including a radially inner, pressure side edge, wherein the radially inner, pressure side edge has a shape having a nominal profile substantially in accordance with Cartesian coordinate values of X, Y and Z set forth in TABLE III and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, pressure side edge of the tip shroud.

Another aspect of the disclosure includes any of the preceding aspects, and the turbine rotor blade includes a third stage blade.

Another aspect of the disclosure includes any of the preceding aspects, and the tip shroud includes two tip rails.

Another aspect of the disclosure includes any of the preceding aspects, and the tip shroud further includes a radially inner, suction side edge, and wherein the radially inner, suction side edge has a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

Another aspect of the disclosure includes a turbine rotor blade comprising: an airfoil having: a suction side, a pressure side opposing the suction side, a leading edge spanning between the pressure side and the suction side, and a trailing edge opposing the leading edge and spanning between the pressure side and the suction side; an endwall having a platform connected with the airfoil along the suction side, the pressure side, the trailing edge and the leading edge, wherein the platform of the endwall defines an origin at a pressure side, aftmost point thereof; and wherein the endwall includes a dovetail coupled to the platform and defining a dovetail length; and a tip shroud connected with the airfoil along the suction side, the pressure side, the trailing edge and the leading edge, the tip shroud including a radially inner, suction side surface, wherein the radially inner, suction side edge having a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

Another aspect of the disclosure includes any of the preceding aspects, and the turbine rotor blade includes a third stage blade.

Another aspect of the disclosure includes any of the preceding aspects, and the tip shroud includes two tip rails.

Two or more aspects described in this disclosure, including those described in this summary section, may be combined to form implementations not specifically described herein.

The details of one or more implementations are set forth in the accompanying drawings and the description below. Other features, objects, and advantages will be apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
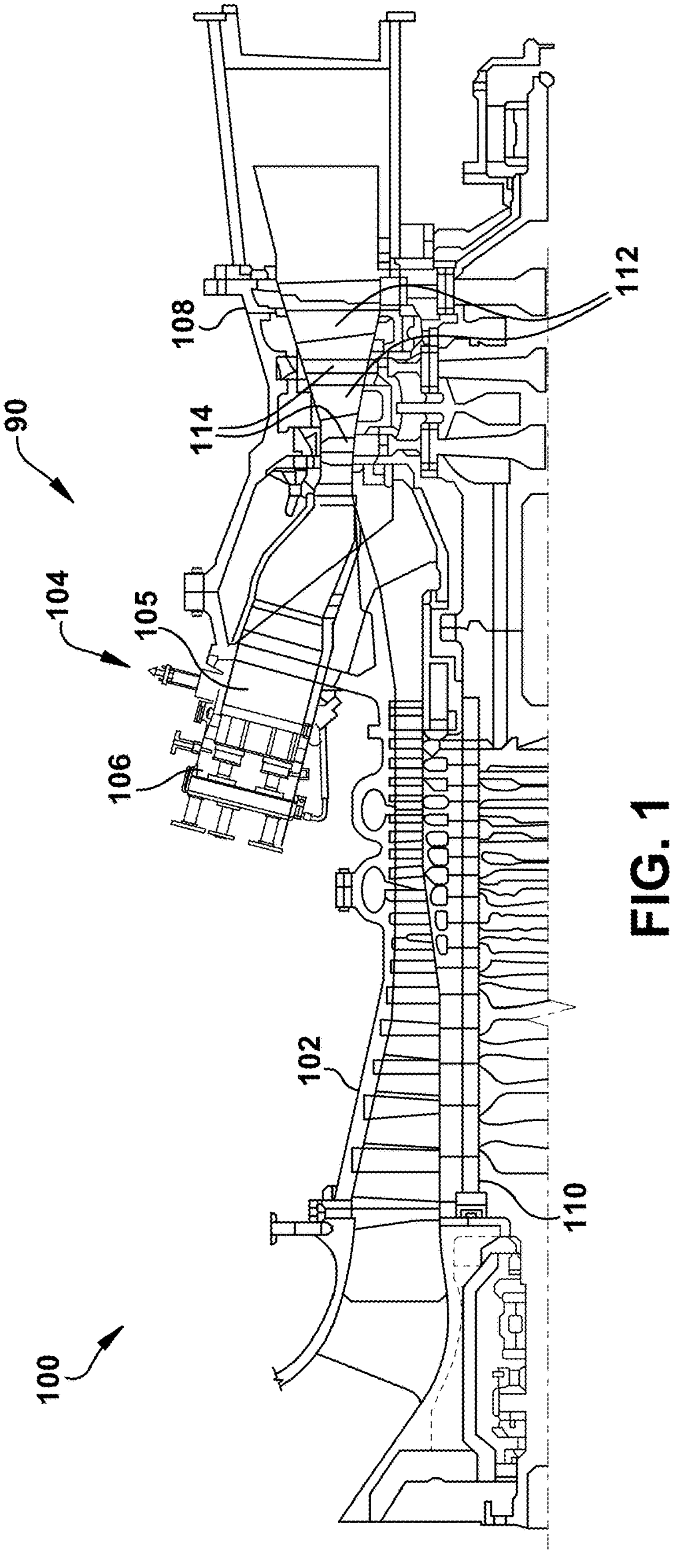
FIG. 1 shows a schematic view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring generally to the front or compressor end of the turbine engine, and "aft" referring generally to the rearward or turbine end of the turbine engine. The term "fore" may be used interchangeably with the term "forward." The terms "forwardmost" and "aftmost," without any further specificity, refer to locations that are closest to the front or compressor section of the engine, or closest to the rearward or turbine section end of the engine, respectively.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine section or turbine engine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described element or feature may or may not be present and that the description includes instances where the element or feature is present and instances where it is not.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine rotor blades that rotate (hereinafter, "blade", "turbine blade" or "turbine rotor blade"). Various embodiments include the blade have an airfoil having: a suction side, a pressure side opposing the suction side, a leading edge spanning between the pressure side and the suction side, and a trailing edge opposing the leading edge and spanning between the pressure side and the suction side. The blades also have an endwall with a platform connected with the airfoil along the suction side, the pressure side, the trailing edge and the leading edge. The endwall also includes a dovetail coupled to the platform and having a dovetail length. The platform of the endwall also defines an origin at a pressure side, aftmost point thereof. The blades also have a tip shroud connected with a tip of the airfoil along the suction side, the pressure side, the trailing edge, and the leading edge. Various embodiments include a tip shroud having a radially inner, suction side surface; a radially inner, pressure side edge; and/or a radially inner, suction side edge, each of a particular defined geometry. The surface and/or edges have a nominal profile substantially in accordance Cartesian coordinate values of X, Y and Z set forth in various tables herein. The Cartesian coordinate values are non-dimensional values of from 0% to 100% convertible to distances by multiplying the values by the dovetail length expressed in units of distance. The X, Y and Z values are connected by smooth continuing arcs that are joined smoothly with one another to form the nominal profile that defines the radially inner, suction side surface; the radially inner, pressure side edge; and/or the radially inner, suction side edge. The disclosed surface and edge profiles provide improved tip shroud and root balancing to improve stress distribution and reduce stress-induced creep. The tip shroud and blade thus have an increased lifespan. The surface and edge profiles also benefit turbine stage efficiency and overall turbine section performance; however, they do not negatively impact aerodynamic characteristics.

Referring to the drawings, FIG. 1 shows a schematic view of an illustrative turbomachine 90 in the form of a combustion turbine or gas turbine (GT) system 100 (hereinafter, "GT system 100"). GT system 100 includes a compressor section 102 and a combustion section 104. Combustion section 104 includes one or more combustors 105 and a head end 106 for each combustor 105 including a plurality of fuel nozzle assemblies. GT system 100 also includes a turbine section 108 and a common rotor compressor/turbine shaft 110 (hereinafter referred to as "rotor shaft 110").

In one non-limiting embodiment, GT system 100 is a GT13E2 engine, commercially available from GE Vernova, Cambridge, MA, USA. The present disclosure is not limited to any one particular GT system and may be implemented in connection with other engines including, for example, the other GT, HA, F, B, LM, TM and E-class engine models of GE Vernova, and engine models of other companies. Further, the teachings of the disclosure are not necessarily applicable to only a GT system and may be applied to other types of turbomachines, e.g., steam turbines, jet engines, compressors, etc.

Figure 2:
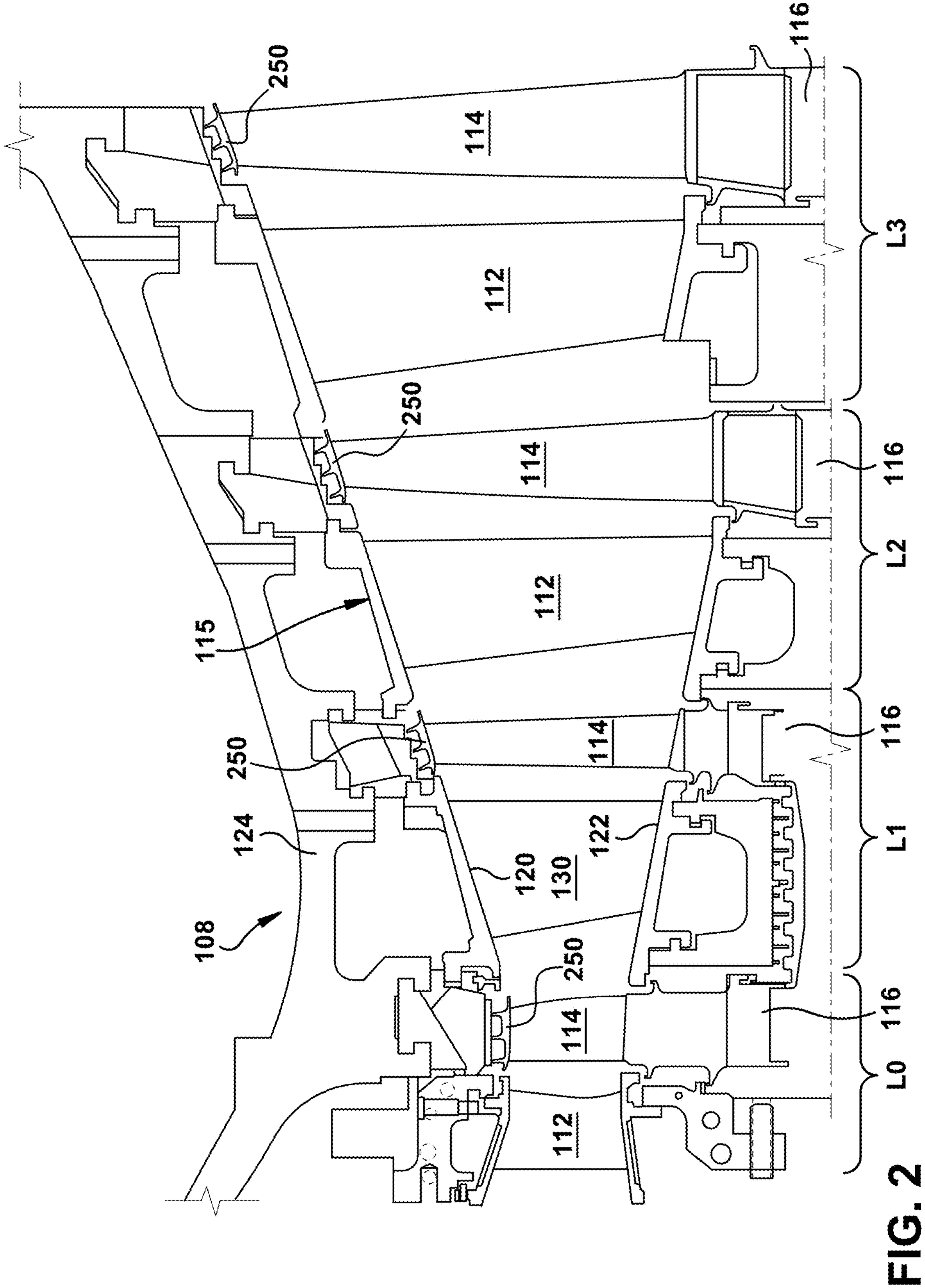
FIG. 2 is a cross-sectional view of an illustrative turbine section with four turbine stages that may be used with the turbomachine in FIG. 1.

FIG. 2 shows a cross-sectional view of an illustrative portion of turbine section 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one non-limiting example only, and each turbine may have more or less than four stages. For example, the GT13E2 engine from GE Vernova has five stages (e.g., stages L0-L4).

A set of stationary vanes or nozzles 112 cooperate with a set of rotating turbine rotor blades 114 to form each stage L0-L3 (or L0-L4) of turbine section 108 and to define a portion of a flow path through turbine section 108. Set of turbine rotor blades 114 in each set are coupled to a respective rotor wheel 116 that couples them circumferentially to rotor shaft 110 (FIG. 1). That is, a plurality of rotating turbine rotor blades 114 are mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with an airfoil 130. In the example shown, nozzle 112 includes a radially outer endwall 120 and a radially inner endwall 122. Radially outer endwall 120 couples nozzle 112 to a stationary casing 124 of turbine section 108.

In operation, air flows through compressor section 102, and compressed air is supplied to combustion section 104. Specifically, the compressed air is supplied to fuel nozzle assemblies that are integral with head end 106 of each respective combustor 105 of combustion section 104. Fuel nozzle assemblies are in flow communication with combustors 105. Fuel nozzle assemblies are also in flow communication with a fuel source (not shown in FIG. 1) and channel fuel and air to combustors 105. Combustor(s) 105 of combustion section 104 ignite and combust fuel to produce combustion products. Combustion section 104 is in flow communication with turbine section 108 (i.e., expansion turbine) within which gas stream thermal energy from the combustion products is converted to mechanical rotational energy. Turbine section 108 is rotatably coupled to and drives rotor shaft 110. Compressor section 102 may also be rotatably coupled with rotor shaft 110. At least one end of rotating rotor shaft 110 may extend axially away from turbine section 108 and may be attached to a load or machinery (not shown), such as, but not limited to, a generator, a load compressor, and/or another turbine.

Figure 3:
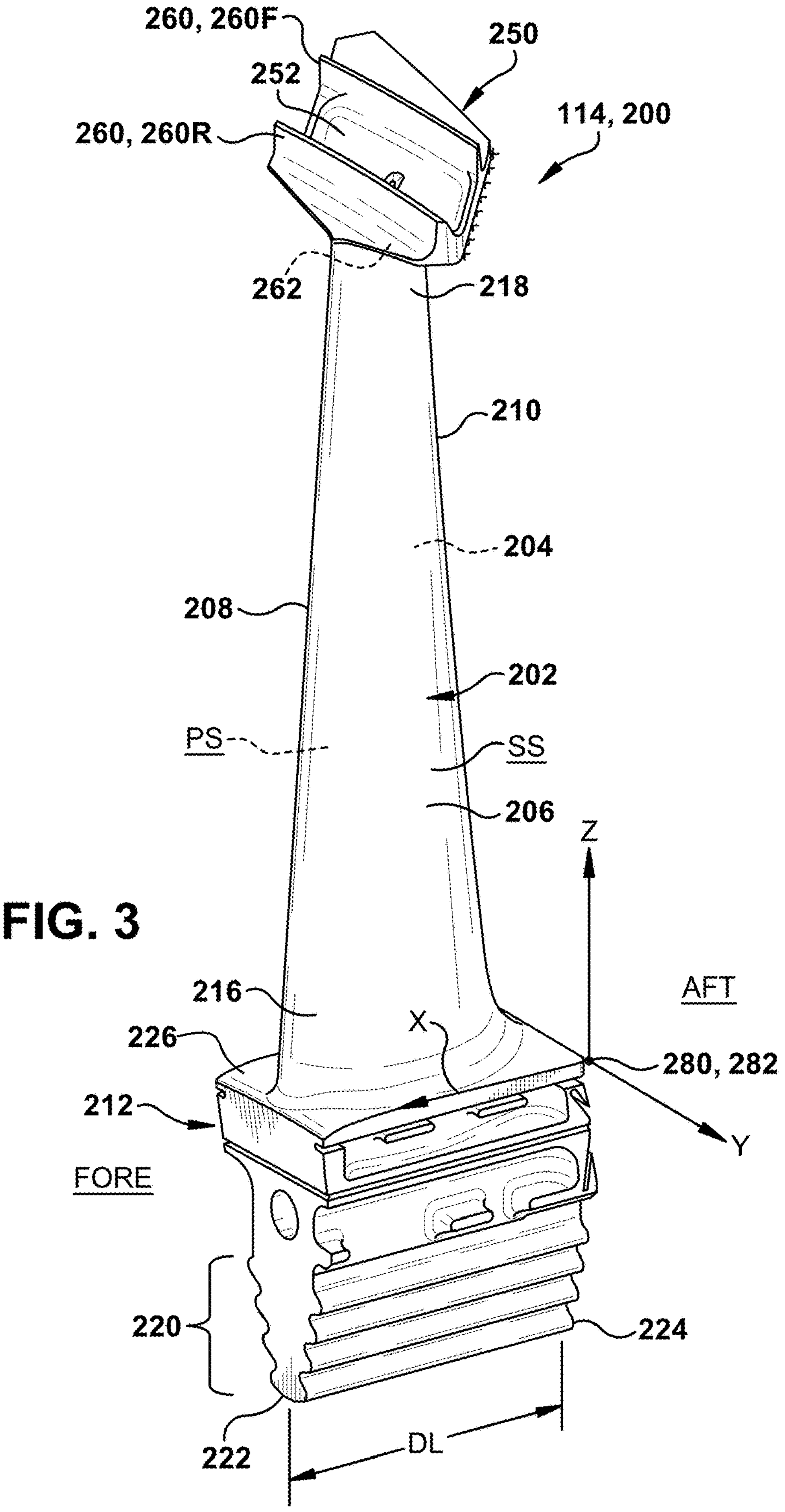
FIG. 3 shows a suction side perspective view of an illustrative turbine rotor blade including an airfoil, an endwall and a tip shroud, according to various embodiments of the disclosure.
Figure 4:
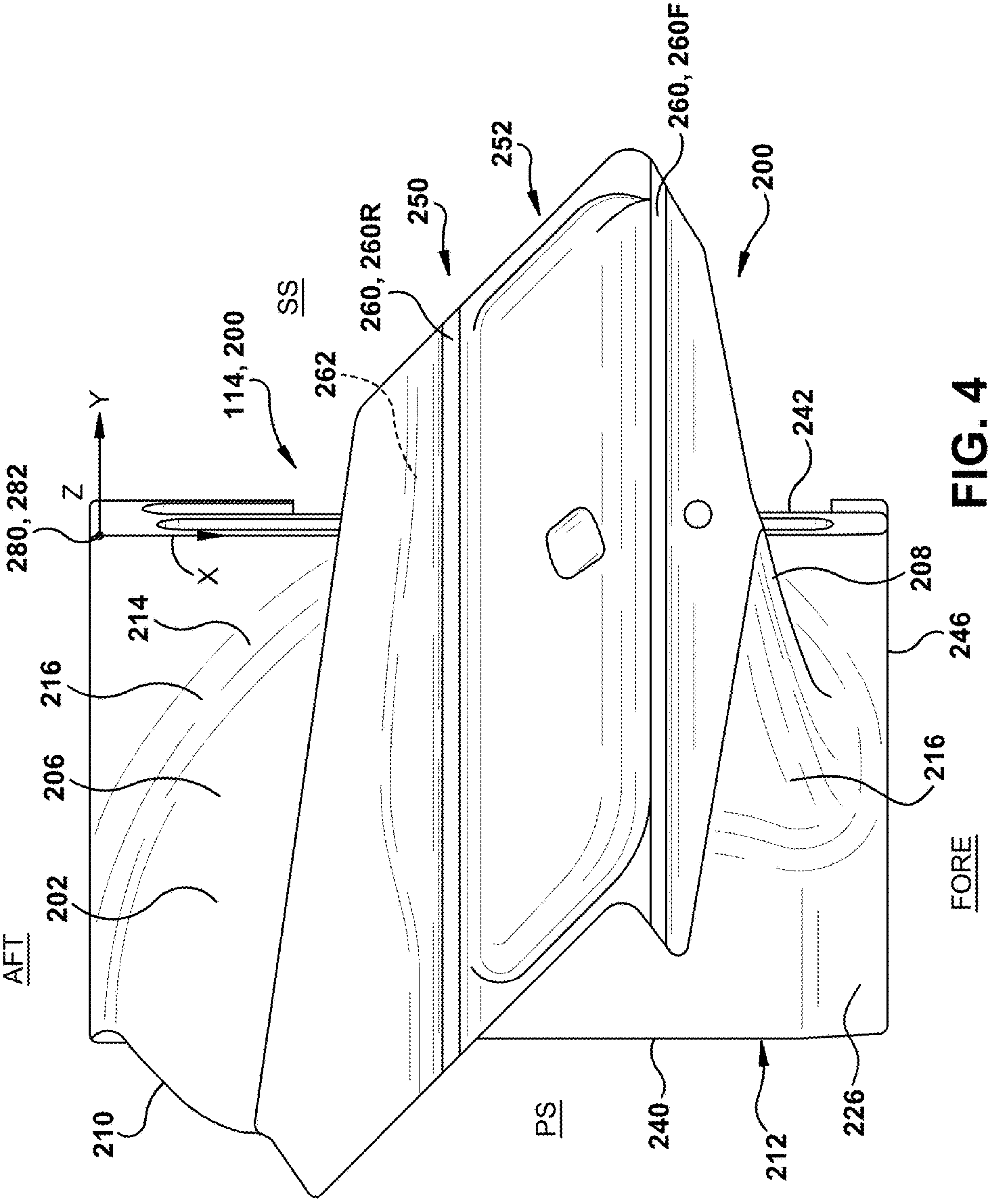
FIG. 4 shows a top-down view of a tip shroud, according to various embodiments of the disclosure.

FIG. 3 shows a suction side perspective view of a blade 200, and FIG. 4 shows a top-down (i.e., radially inward) view of blade 200, according to embodiments of the disclosure. Blade 200 is a rotatable (dynamic) blade, which is part of the set of turbine rotor blades 114 (FIG. 2) circumferentially dispersed about rotor shaft 110 (FIG. 1) in a stage of turbine section 108. During operation of turbine section 108, a working fluid (e.g., gas or steam) is directed across the blade's airfoil, and blade 200 rotates with rotor shaft 110 (FIG. 1) about an axis defined by rotor shaft 110 (FIG. 1). It is understood that blade 200 is configured to couple with a plurality of similar or distinct blades (e.g., blades 200 or other blades) with respective tip shrouds 250 to form a set of blades in a stage of the turbine (e.g., one of stages L0-L3 shown in FIG. 2).

Blade 200 can include an airfoil 202 having a pressure side 204 (view obstructed in FIG. 3) and a suction side 206 opposing pressure side 204. Blade 200 can also include a leading edge 208 spanning between pressure side 204 and suction side 206, and a trailing edge 210 opposing leading edge 208 and spanning between pressure side 204 and suction side 206. As shown in FIGS. 3-4, blade 200 can also include an endwall 212 connected with a root portion 216 (or "first end") of airfoil 202, and tip shroud 250 connected with a tip portion 218 (or "second end") of airfoil 202 on an opposite end of airfoil 202 from endwall 212.

Endwall 212 is configured to fit into a mating slot in rotor wheel 116 (FIG. 2), which is coupled to rotor shaft 110 (FIG. 1), and to mate with adjacent components of other blades 200. Endwall 212 includes a platform 226 intended to be located radially inboard of airfoil 202 and a coupling element to be formed in any complementary configuration to rotor shaft 110 (FIG. 1). For example, endwall 212 may include a dovetail 220 as the coupling element configured to mate with an opening (not shown) in a rotor wheel 116 (FIG. 2) coupled to rotor shaft 110 (FIG. 1). As shown in FIG. 3, dovetail 220 has a dovetail length DL extending from a first end 222 thereof to a second end 224 thereof. Dovetail length DL extends along a circumferentially extending Y-direction relative to rotor shaft 110. Dovetail 220 can have any suitable configuration to connect to rotor shaft 110 (FIG. 1), e.g., pine tree (as shown) or other coupling configuration.

Endwall 212 and tip shroud 250 can connect to airfoil 202 along suction side 206, pressure side 204, trailing edge 210 and leading edge 208. For example, airfoil 202 of blade 200 can be coupled to platform 226 of endwall 212 and to tip shroud 250 by fillets 214 proximate root portion 216 (first end) of airfoil 202 and tip portion 218 (second end) of airfoil 202, respectively. Fillets 214 can include a weld or braze fillet, which may be formed via conventional MIG welding, TIG welding, brazing, etc.

With reference to FIGS. 2 and 3, in various non-limiting embodiments, blade 200 can include a first stage (L0) blade, a second stage (L1) blade, a third stage (L2) blade, or a fourth stage (L3) blade. In particular embodiments, blade 200 is a third stage (L2) blade. In various embodiments, turbine section 108 can include a set of blades 200 having the geometry defined herein in only the first stage (L0), or in only second stage (L1), or in only third stage (L2), or in only fourth stage (L3) of turbine section 108.

Figure 5:
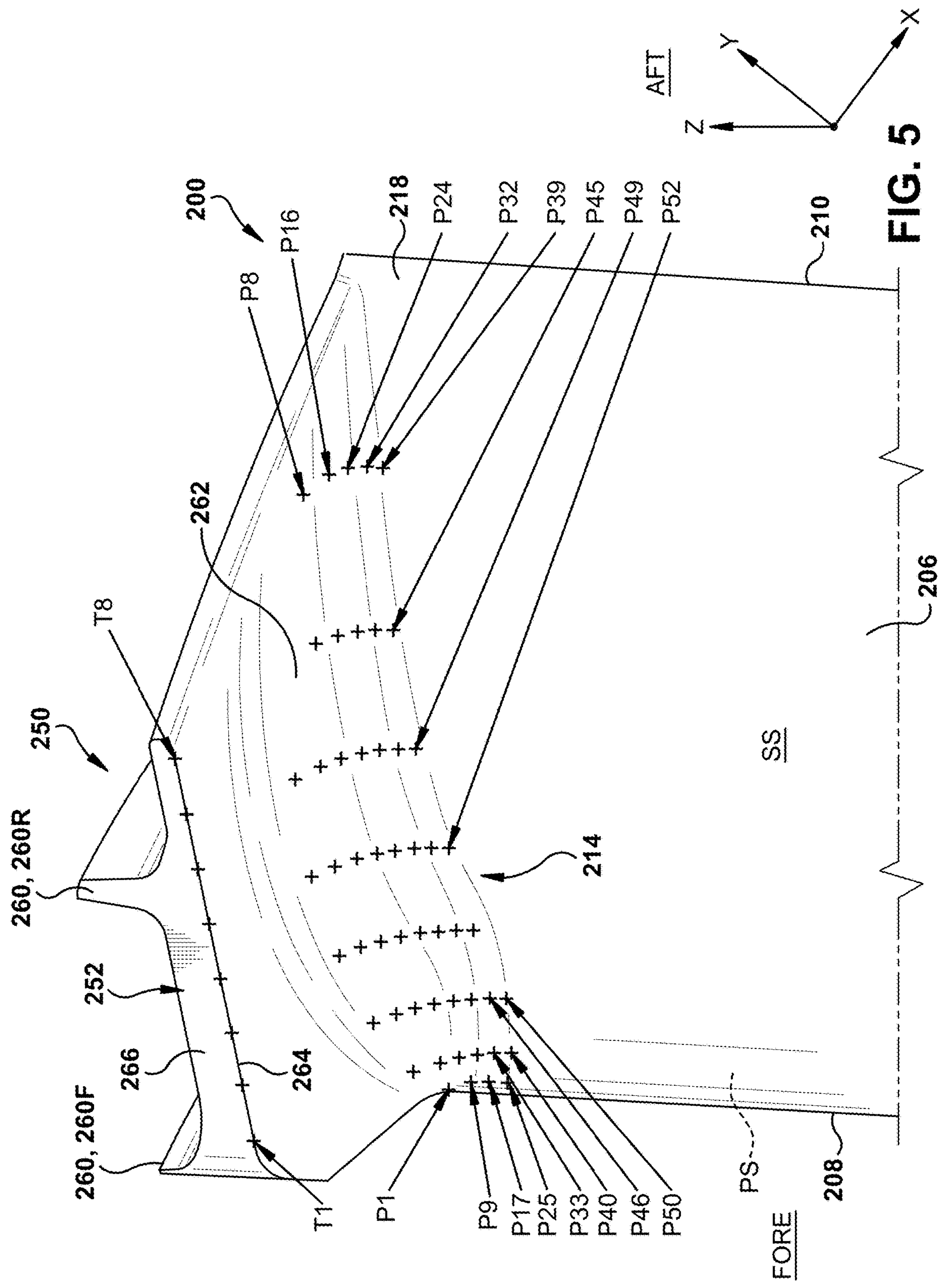
FIG. 5 shows a suction side perspective and radially outward view of an airfoil and a tip shroud, according to various embodiments of the disclosure.
Figure 6:
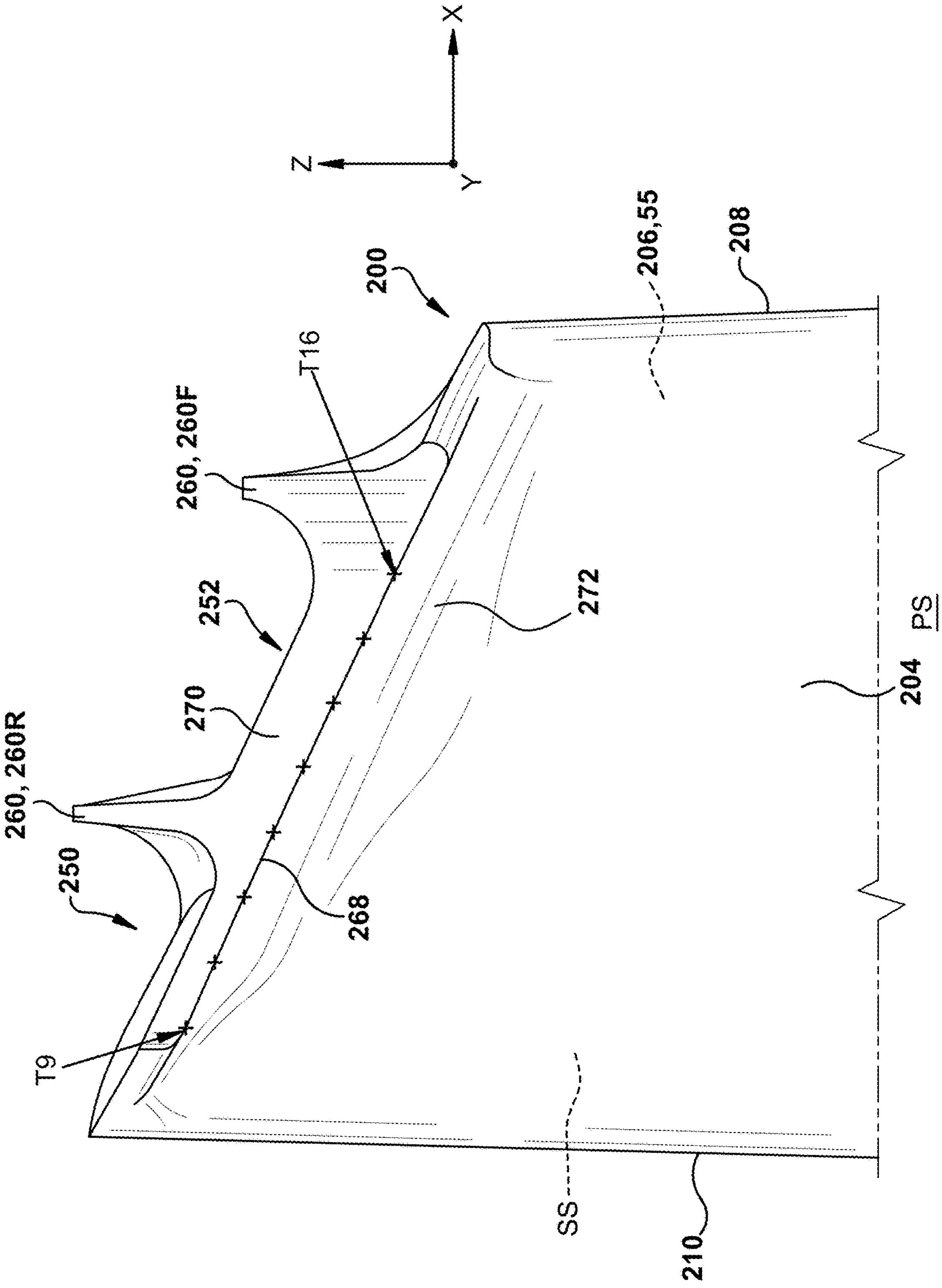
FIG. 6 shows a pressure side view of an airfoil and a tip shroud, according to various embodiments of the disclosure.

FIG. 5 shows a suction side perspective and radially outward view, and FIG. 6 shows a pressure side perspective view of tip shroud 250, according to embodiments of the disclosure. Tip shroud 250 can include a body 252 and one or more tip rails 260 that extend generally radially outward from body 252. In the non-limiting example shown, tip shroud 250 includes two tip rails 260, including a forward-most tip rail 260F and a rearward-most tip rail 260R. Tip shroud 250 can include more or fewer tip rails 260.

For reference purposes, in FIGS. 3-5, a forward side of tip shroud 250 that is generally to the front or compressor end of the engine is indicated with "FORE," and an aft side of tip shroud 250 that is generally to the rearward or turbine end of the engine is indicated with "AFT." As also shown in FIGS. 3-6, where appropriate, a pressure side of tip shroud 250 is indicated with "PS," and/or a suction side of tip shroud 250 is indicated with "SS." It is noted that blade 200 may not be mounted in rotor shaft 110 in a perfectly axial direction. For example, some angling of side slash faces 240, 242, shown in FIG. 4, of endwall 212 of blade 200 relative to a forward slash face 246 thereof may allow blade 200 to slide into rotor wheel 116 (FIG. 2) at an angle relative to the axis of rotor shaft 110.

As used herein, and as shown in FIG. 5, a radially inner, suction side surface 262 of tip shroud 250 is immediately radially inward on suction side 206 of airfoil 202. Radially inner, suction side surface 262 may include or be part of fillet 214 that coupled airfoil 202 to tip shroud 250 at tip portion 218 (second end) of airfoil 202. As shown in FIG. 5, a radially inner, suction side edge 264 of tip shroud 250 is defined on body 252 at the intersection of an aft surface 266 of tip shroud 250 and radially inner, suction side surface 262 on suction side 206 of airfoil 202. As shown in FIG. 6, a radially inner, pressure side edge 268 of tip shroud 250 is defined on body 252 at the intersection of a forward surface 270 of tip shroud 250 and a radially inner, pressure side surface 272 on pressure side 206 of airfoil 202. As shown in FIG. 6, radially inner, pressure side surface 272 of tip shroud 250 is immediately radially inward on pressure side 204 of airfoil 202.

As shown in FIGS. 3 and 4, endwall 212 also includes a reference point used as an "origin" for defining a shape of surfaces and/or edges having a nominal profile substantially in accordance with Cartesian coordinate values of X, Y and Z set forth in a respective table herein. More specifically, as shown in FIGS. 3 and 4, platform 226 of endwall 212 defines an origin 280 at a pressure side, aftmost point 282 thereof. A legend for X, Y, Z directions is shown at origin 280. The X direction extends axially and is positive in a forward direction from origin 280 toward leading edge 208, the Y direction extends circumferentially (generally along tip rails 260) and is positive in a direction from origin 280 away from suction side 206, and the Z direction extends radially from origin 280 and is positive in a radially outward direction from origin 280, i.e., away from endwall 212.

Radially inner, suction side surface 262; radially inner, suction side edge 264; and radially inner, pressure side edge 268, as defined herein, are configured to rebalance mass compared to other tip shrouds to reduce creep from stress and to lengthen the life cycle of tip shroud 250 and blade 200. The surface 262 and/or edges 264, 268 of tip shroud 250 have shapes having a respective nominal profile substantially in accordance with Cartesian coordinate values of X, Y and Z set forth in a respective table herein and originating at origin 280. The Cartesian coordinate values are non-dimensional values of from 0% to 100% convertible to distances by multiplying the values by the desired dovetail length DL (FIG. 3) expressed in units of distance. That is, the X, Y, and Z coordinate values in the tables have been expressed in normalized or non-dimensionalized form in values of from 0 to 1 (percentages). However, it should be apparent that any or all of the coordinate values could instead be expressed in distance units so long as the percentages and proportions are maintained.

To convert an X, Y or Z value of the tables to a respective X, Y or Z coordinate value in units of distance, such as inches or meters, the non-dimensional X, Y or Z value given in the tables can be multiplied by a desired or predetermined dovetail length DL (FIG. 3) for blade 200 in such units of distance. By connecting the X, Y, and Z values with smooth continuing arcs, each coordinate can be identified and fixed, and the surface profiles of the various surface and/or edges between the coordinates can be determined by smoothly connecting adjacent coordinates to one another and defining a surface or edge therebetween, thus forming the nominal surface or edge profile as the case may be. Suction side surface 262 can be planar or may include some curvature so long as the X, Y, Z coordinates are present. Similarly, the edges 264, 268 can be linear or may include some curvature so long as the X, Y, Z coordinates are present.

The values in the tables are non-dimensionalized values generated and shown to three decimal places for determining the nominal profile of the various surface and/or edges at ambient, non-operating, or non-hot conditions, and do not take any coatings or fillets into account, though embodiments could account for other conditions, coatings, and/or fillets. To allow for typical manufacturing tolerances and/or coating thicknesses, +/− values can be added to the values listed in the tables. For example, in one embodiment, a tolerance of 15 percent of a thickness of direction normal to any surface or edge can define a profile envelope for a tip shroud design at cold or room temperature. In other words, a distance of 15 percent of a thickness in a direction normal to any surface along the surface or edge profile can define a range of variation between measured points on an actual surface or edge and ideal positions of those points, particularly at a cold or room temperature, as embodied by the disclosure. In another embodiment, a tolerance of 20 percent of a thickness of direction normal to any surface or edge can define a profile envelope for a tip shroud design at cold or room temperature. The surface and/or edge profiles, as embodied herein, are robust to these ranges of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized values by a common scaling factor, which may be a larger or smaller number of distance units than might have originally been used for a tip shroud 250 with a given dovetail length DL (FIG. 3). For example, the non-dimensionalized values in a table could be multiplied uniformly by a scaling factor of 2, 0.5, or any other desired scaling factor instead of or in addition to multiplying the dovetail length DL. In various embodiments, the X, Y, and Z distances are scalable as a function of the same constant or number to provide a scaled up or scaled down tip shroud.

Note that the data points, e.g., P1, T1 or T9, shown in the drawings are merely representative and do not necessarily match the X, Y, Z coordinate data points in the tables.

As shown in FIG. 5, radially inner, suction side surface 262 has a shape having a nominal profile substantially in accordance with Cartesian coordinate values of X, Y and Z set forth in TABLE I and originating at origin 280 (FIGS. 3-4). The Cartesian coordinate values are non-dimensional values of from 0% to 100% convertible to distances by multiplying the values by dovetail length DL (FIG. 3) expressed in units of distance. The X, Y and Z values are connected by smooth continuing arcs that are joined smoothly with one another to form the nominal profile that defines radially inner, suction side surface 262.

TABLE I

[non-dimensionalized values]

| POINTS | X | Y | Z |
|---|---|---|---|
| P1 | 101.892 | 10.651 | 382.340 |
| P2 | 95.521 | 17.674 | 385.103 |
| P3 | 85.871 | 20.456 | 389.757 |
| P4 | 76.221 | 18.728 | 394.680 |
| P5 | 66.571 | 12.343 | 399.881 |
| P6 | 56.921 | 1.586 | 405.342 |
| P7 | 47.271 | −15.579 | 411.185 |
| P8 | 36.179 | −44.302 | 418.437 |
| P9 | 101.892 | 9.006 | 379.864 |
| P10 | 95.521 | 14.657 | 382.709 |
| P11 | 85.871 | 17.514 | 387.358 |
| P12 | 76.221 | 15.611 | 392.291 |
| P13 | 66.571 | 8.832 | 397.515 |
| P14 | 56.921 | −2.575 | 403.015 |
| P15 | 47.271 | −20.901 | 408.927 |
| P16 | 36.179 | −50.334 | 416.222 |
| P17 | 101.892 | 8.047 | 377.346 |
| P18 | 95.521 | 12.571 | 380.258 |
| P19 | 85.871 | 15.284 | 384.916 |
| P20 | 76.221 | 13.260 | 389.857 |
| P21 | 66.571 | 6.289 | 395.092 |
| P22 | 56.921 | −5.506 | 400.615 |
| P23 | 47.271 | −23.952 | 406.535 |
| P24 | 36.179 | −52.820 | 413.796 |
| P25 | 101.892 | 7.593 | 374.799 |
| P26 | 95.521 | 11.147 | 377.769 |
| P27 | 85.871 | 13.562 | 382.445 |
| P28 | 76.221 | 11.454 | 387.390 |
| P29 | 66.571 | 4.406 | 392.630 |
| P30 | 56.921 | −7.547 | 398.162 |
| P31 | 47.271 | −25.654 | 404.062 |
| P32 | 36.179 | −53.652 | 411.271 |
| P33 | 95.521 | 10.248 | 375.248 |
| P34 | 85.871 | 12.239 | 379.949 |
| P35 | 76.221 | 10.057 | 384.899 |
| P36 | 66.571 | 3.032 | 390.137 |
| P37 | 56.921 | −8.910 | 395.669 |
| P38 | 47.271 | −26.510 | 401.538 |
| P39 | 36.179 | −53.687 | 408.698 |
| P40 | 95.521 | 9.808 | 372.699 |
| P41 | 85.871 | 11.265 | 379.349 |
| P42 | 76.221 | 9.000 | 382.387 |
| P43 | 66.571 | 2.068 | 387.620 |
| P44 | 56.921 | −9.719 | 393.143 |
| P45 | 47.271 | −26.807 | 398.981 |
| P46 | 85.871 | 10.607 | 374.897 |
| P47 | 76.221 | 8.235 | 379.858 |
| P48 | 66.571 | 1.446 | 385.083 |
| P49 | 56.921 | −10.067 | 390.589 |
| P50 | 85.871 | 10.246 | 372.344 |
| P51 | 76.221 | 7.735 | 377.313 |
| P52 | 66.571 | 1.122 | 382.527 |

As shown in FIG. 5, radial inner, suction side edge 264 of tip shroud 250 has a shape having a nominal profile substantially in accordance with Cartesian coordinate values of X, Y and Z set forth in TABLE II and originating at origin 280 (FIG. 3-4). The Cartesian coordinate values are non-dimensional values of from 0% to 100% convertible to distances by multiplying the values by dovetail length DL (FIG. 3) expressed in units of distance. The X, Y and Z values are connected by smooth continuing arcs that are joined smoothly with one another to form the nominal profile that defines radial inner, suction side edge 264 of tip shroud 250.

TABLE II

[non-dimensionalized values]

| POINTS | X | Y | Z |
|---|---|---|---|
| T1 | 82.597 | 61.293 | 393.734 |
| T2 | 76.928 | 55.623 | 396.982 |
| T3 | 71.251 | 49.947 | 400.205 |
| T4 | 65.568 | 44.263 | 403.403 |
| T5 | 59.877 | 38.573 | 406.578 |
| T6 | 54.181 | 32.876 | 409.729 |
| T7 | 48.477 | 27.173 | 412.856 |
| T8 | 42.767 | 21.463 | 415.959 |

As shown in FIG. 6, radial inner, pressure side edge 268 of tip shroud 250 has a shape having a nominal profile substantially in accordance with Cartesian coordinate values of X, Y and Z set forth in TABLE III and originating at origin 280 (FIGS. 3-4). The Cartesian coordinate values are non-dimensional values of from 0% to 100% convertible to distances by multiplying the values by dovetail length DL (FIG. 3) expressed in units of distance. The X, Y and Z values are connected by smooth continuing arcs that are joined smoothly with one another to form the nominal profile that defines radial inner, pressure side edge 268 of tip shroud 250.

TABLE III

[non-dimensionalized values]

| POINTS | X | Y | Z |
|---|---|---|---|
| T9 | 36.172 | −105.262 | 418.158 |
| T10 | 42.708 | −98.726 | 415.264 |
| T11 | 49.237 | −92.197 | 412.341 |
| T12 | 55.759 | −85.675 | 409.389 |
| T13 | 62.275 | −79.159 | 406.406 |
| T14 | 68.784 | −72.650 | 403.394 |
| T15 | 75.286 | −66.148 | 400.353 |
| T16 | 81.781 | −59.653 | 397.281 |

The X, Y, Z data points in each of TABLES I through III herein may be joined smoothly with one another (with lines and/or arcs) to form the respective surface and/or edge profiles using any now known or later developed curve fitting technique generating a curved surface or curved edge appropriate for the respective surface or edge profile. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The teachings of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Embodiments of the disclosure provide various technical and commercial advantages, examples of which are discussed herein. For example, the disclosed surface and edge profiles provide improved tip shroud and root balancing to improve stress distribution and reduce stress-induced creep, resulting in lengthening a life of tip shroud 250 and blade 200. The surface and edge profiles also benefit turbine stage efficiency and overall turbine section performance. The surface and edge profiles, however, do not negatively impact aerodynamic characteristics.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine rotor blade comprising:

an airfoil having: a suction side, a pressure side opposing the suction side, a leading edge spanning between the pressure side and the suction side, and a trailing edge opposing the leading edge and spanning between the pressure side and the suction side;

an endwall having a platform connected with the airfoil along the suction side, the pressure side, the trailing edge and the leading edge, wherein the platform of the endwall defines an origin at a pressure side, aftmost point thereof, and wherein the endwall includes a dovetail coupled to the platform and having a dovetail length; and a tip shroud connected with the airfoil along the suction side, the pressure side, the trailing edge and the leading edge, the tip shroud including a radially inner, suction side surface, wherein the radially inner, suction side surface has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radial inner, suction side surface.

2. The turbine rotor blade of claim 1, wherein the turbine rotor blade includes a third stage blade.

3. The turbine rotor blade of claim 1, wherein the tip shroud includes two tip rails.

4. The turbine rotor blade of claim 1, wherein the tip shroud further includes a radially inner, pressure side edge, and wherein the radially inner, pressure side edge has a shape having a nominal profile substantially in accordance with Cartesian coordinate values of X, Y and Z set forth in TABLE III and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, pressure side edge of the tip shroud.

5. The turbine rotor blade of claim 4, wherein the tip shroud further includes a radially inner, suction side edge, and wherein the radially inner, suction side edge has a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

6. The turbine rotor blade of claim 1, wherein the tip shroud further includes a radially inner, suction side edge, and wherein the radially inner, suction side edge has a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

7. A turbine rotor blade comprising:

an airfoil having: a suction side, a pressure side opposing the suction side, a leading edge spanning between the pressure side and the suction side, and a trailing edge opposing the leading edge and spanning between the pressure side and the suction side;

an endwall having a platform connected with the airfoil along the suction side, the pressure side, the trailing edge and the leading edge, wherein the platform of the endwall defines an origin at a pressure side, aftmost point thereof, and wherein the endwall includes a dovetail coupled to the platform and having a dovetail length; and a tip shroud connected with the airfoil along the suction side, the pressure side, the trailing edge and the leading edge, the tip shroud including a radially inner, pressure side edge, wherein the radially inner, pressure side edge has a shape having a nominal profile substantially in accordance with Cartesian coordinate values of X, Y and Z set forth in TABLE III and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, pressure side edge of the tip shroud.

8. The turbine rotor blade of claim 7, wherein the turbine rotor blade includes a third stage blade.

9. The turbine rotor blade of claim 7, wherein the tip shroud includes two tip rails.

10. The turbine rotor blade of claim 7, wherein the tip shroud further includes a radially inner, suction side edge, and wherein the radially inner, suction side edge has a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

11. A turbine rotor blade comprising:

an airfoil having: a suction side, a pressure side opposing the suction side, a leading edge spanning between the pressure side and the suction side, and a trailing edge opposing the leading edge and spanning between the pressure side and the suction side;

an endwall having a platform connected with the airfoil along the suction side, the pressure side, the trailing edge and the leading edge, wherein the platform of the endwall defines an origin at a pressure side, aftmost point thereof, and wherein the endwall includes a dovetail coupled to the platform and having a dovetail length; and a tip shroud connected with the airfoil along the suction side, the pressure side, the trailing edge and the leading edge, the tip shroud including a radially inner, suction side surface, wherein the radially inner, suction side edge having a shape having a nominal profile substantially in accordance with Cartesian coordinate values of X, Y and Z set forth in TABLE II and originating at the origin, wherein the Cartesian coordinate values are non-dimensional values of from 0% to 100% convertible to distances by multiplying the values by the dovetail length expressed in units of distance, and wherein X, Y and Z values are connected by smooth continuing arcs that are joined smoothly with one another to form the nominal profile that defines the radially inner, suction side edge of the tip shroud.

12. The turbine rotor blade of claim 11, wherein the turbine rotor blade includes a third stage blade.

13. The turbine rotor blade of claim 11, wherein the tip shroud includes two tip rails.

* * * * *